(12) United States Patent
Friederich et al.

(10) Patent No.: US 9,763,286 B2
(45) Date of Patent: Sep. 12, 2017

(54) FLUID SYSTEM WITH AT LEAST ONE HEATING DEVICE FOR FLUID, AND HEATING DEVICE

(71) Applicant: Mann+Hummel GMBH, Ludwigsburg (DE)

(72) Inventors: Thomas Friederich, Stuttgart (DE); Holger Beyerlin, Rutesheim (DE); Sven Weidinger, Weinstadt (DE); Marco Goedecke, Freiberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 23 days.

(21) Appl. No.: 15/045,175

(22) Filed: Feb. 16, 2016

(65) Prior Publication Data

US 2016/0165664 A1 Jun. 9, 2016

Related U.S. Application Data

(63) Continuation of application No. PCT/EP2014/066731, filed on Aug. 4, 2014.

(30) Foreign Application Priority Data

Aug. 20, 2013 (DE) .................. 10 2013 013 713

(51) Int. Cl.
*H05B 3/02* (2006.01)
*H05B 1/02* (2006.01)
(Continued)

(52) U.S. Cl.
CPC ........... *H05B 1/0244* (2013.01); *B01D 35/18* (2013.01); *F02M 31/125* (2013.01);
(Continued)

(58) Field of Classification Search
CPC ............... H05B 1/0244; H05B 1/0236; H05B 2203/009; H05B 2203/02; H05B 2203/03;
(Continued)

(56) References Cited

U.S. PATENT DOCUMENTS 4,387,691 A * 6/1983 Marcoux ................ B01D 35/18
123/549
4,479,477 A 10/1984 Manchester
(Continued)

FOREIGN PATENT DOCUMENTS

DE 102011000246 A1 5/2012
EP 0367631 A1 5/1990
EP 0581176 A2 2/1994

*Primary Examiner* — Mark Paschall
(74) *Attorney, Agent, or Firm* — James Hasselbeck

(57) ABSTRACT

A fluid system of an internal combustion engine is provided with a heating device in a heating chamber. An electric heating element of the heating device is arranged between two holding bodies such that the heating element electrically and thermally contacts a contact section of at least one of the holding bodies. The heating chamber has an inner volume region between the holding bodies and at least one outer volume region arranged on an outer side of the holding bodies. The inner and outer volume regions allow fluid to flow through. The inner volume region has an enlarged section with a first spacing measured between the holding bodies. The holding bodies have a second spacing measured in a region of the contact section. The first spacing is greater than the second spacing at least at a circumferential side of the contact section facing the enlarged section.

15 Claims, 3 Drawing Sheets

(51) Int. Cl.
  *B01D 35/18* (2006.01)
  *F02M 37/22* (2006.01)
  *F02M 31/125* (2006.01)
  *H05B 3/00* (2006.01)
  *H05B 3/40* (2006.01)
  *F24H 1/12* (2006.01)
  *F24H 1/10* (2006.01)
  *F24H 9/18* (2006.01)
  *F24H 9/20* (2006.01)

(52) U.S. Cl.
  CPC ............ *F02M 37/223* (2013.01); *F24H 1/101* (2013.01); *F24H 1/121* (2013.01); *H05B 1/0236* (2013.01); *H05B 3/0004* (2013.01); *H05B 3/023* (2013.01); *H05B 3/40* (2013.01); *F01N 2240/16* (2013.01); *F01N 2610/02* (2013.01); *F01N 2610/1486* (2013.01); *F24H 9/1827* (2013.01); *F24H 9/2028* (2013.01); *F24H 2250/04* (2013.01); *H05B 2203/009* (2013.01); *H05B 2203/02* (2013.01); *H05B 2214/03* (2013.01); *Y02T 10/126* (2013.01)

(58) Field of Classification Search
  CPC .......... H05B 3/004; H05B 3/023; H05B 3/40; Y10T 10/126; B01D 35/18; F02M 37/223; F24H 1/101; F24H 9/1827; F24H 9/2028; F24H 2250/04
  USPC ............... 219/205, 207, 202, 494, 504, 505; 392/479, 480
  See application file for complete search history.

(56) References Cited

U.S. PATENT DOCUMENTS

| | | | |
|---|---|---|---|
| 5,855,772 A * | 1/1999 | Miller | B01D 29/15 210/149 |
| 7,860,381 B2 | 12/2010 | Wallhaeusser et al. | |
| 9,476,393 B2 * | 10/2016 | Kabasin | F02M 53/06 |
| 2012/0183282 A1 * | 7/2012 | Hatakeyama | F02M 21/06 392/480 |

* cited by examiner

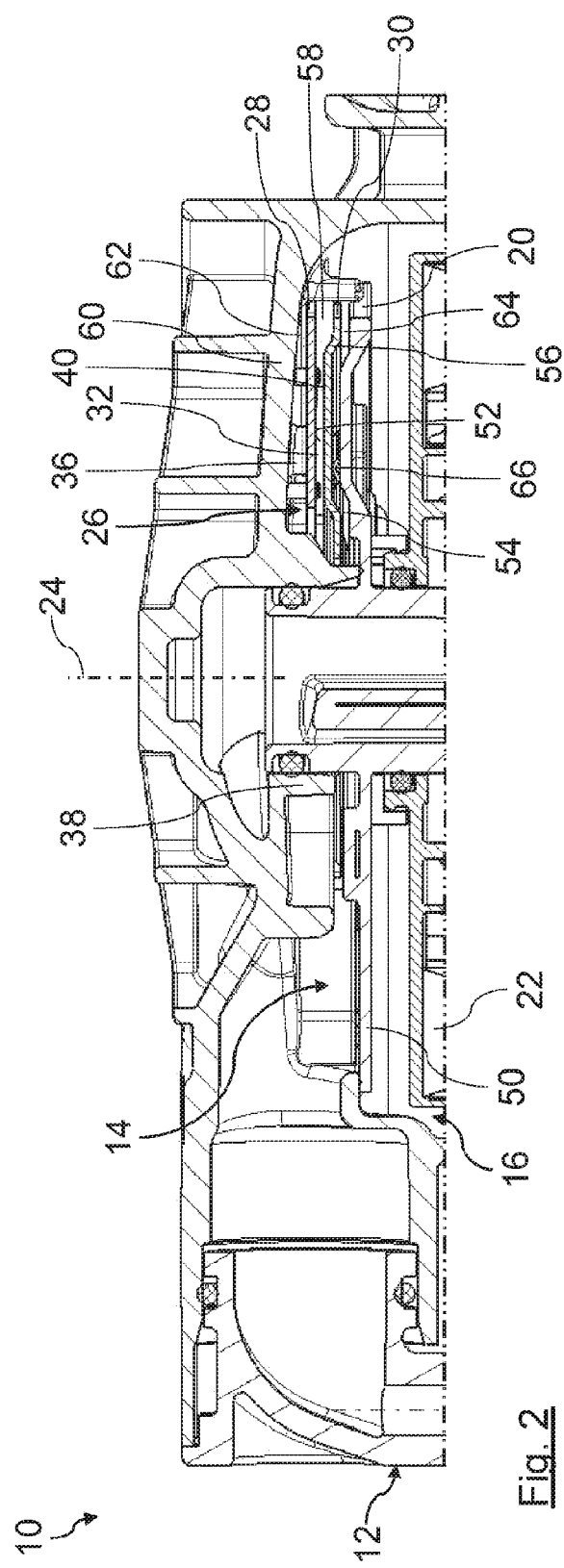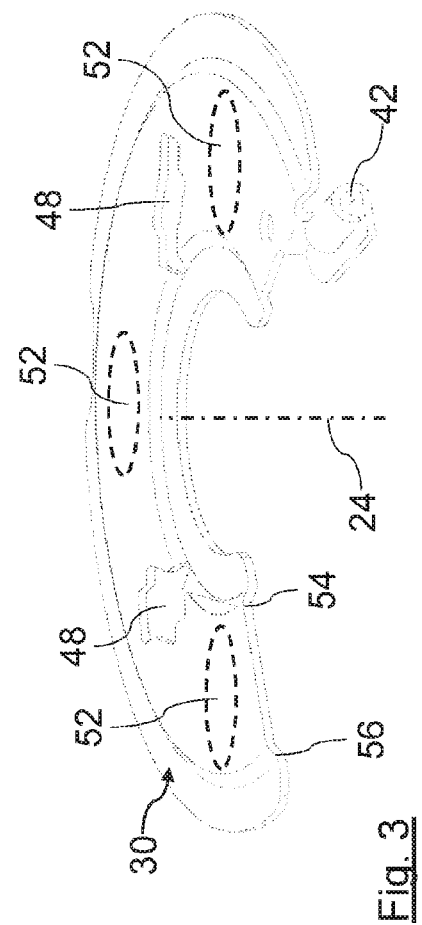
Fig. 2
Fig. 3

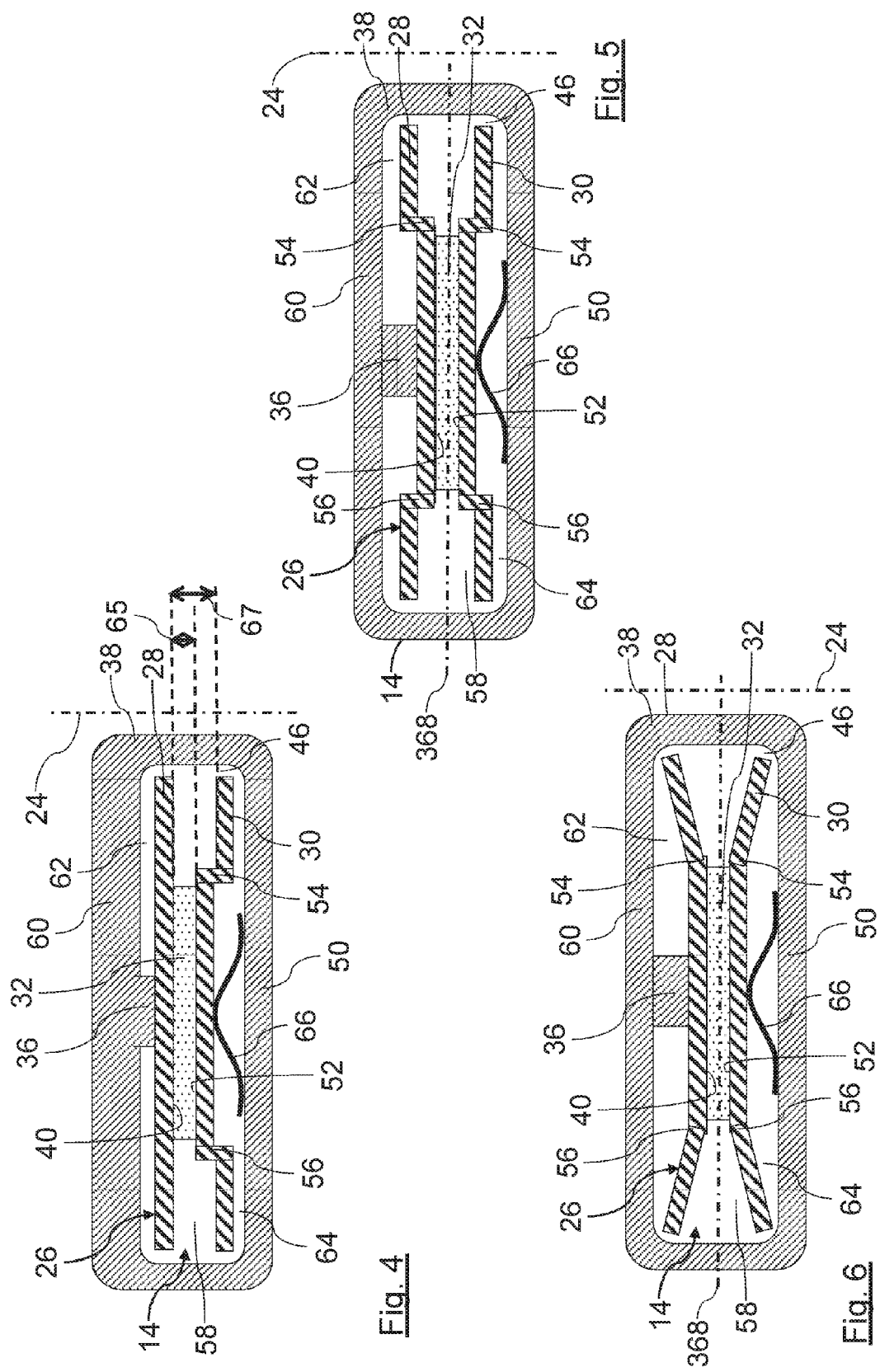

though the volume regions. The comparable section planes
FLUID SYSTEM WITH AT LEAST ONE HEATING DEVICE FOR FLUID, AND HEATING DEVICE This application is a continuation application of international application No. PCT/EP2014/066731 having an international filing date of 4 Aug. 2014 and designating the United States, the international application claiming a priority date of 20 Aug. 2013, based on prior filed German application No. 10 2013 013 713.6, the entire contents of the aforesaid international application and the aforesaid German patent application being incorporated herein by reference.

TECHNICAL FIELD

Background of the Invention

The invention concerns a fluid system, in particular filter system, for fluid, in particular fuel, oil, water or urea solution, in particular of an internal combustion engine, in particular of a motor vehicle, including at least one heating device for fluid, including at least one heating chamber provided with at least one inlet and at least one outlet for the fluid.

Moreover, the invention concerns a heating device for fluid, in particular fuel, oil, water or urea solution, in particular of an internal combustion engine, in particular of a motor vehicle, in particular of a fluid system according to the invention.

A filter system, known on the market, for diesel fuel of an internal combustion engine of a motor vehicle includes a fuel heater. By means of the fuel heater, the fuel can be heated in a heating chamber of the filter system before it reaches a raw side of the filter element of the filter system. In this way, in particular when ambient temperatures are low, the flowability of the fuel can be improved and a pressure difference between the raw side and a clean side of the filter element can be reduced.

The invention has the object to design a fluid system and a heating device for fluid of the aforementioned kind in which heating of the fluid with the heating device can be improved.

SUMMARY OF THE INVENTION

This object is solved according to the invention in that, in the at least one heating chamber, at least one electrically operated heating element is arranged between two holding bodies in such a way that it is electrically and thermally contacting at least one contact section of at least one of the holding bodies, wherein at least one inner volume region between the two holding bodies and at least one outer volume region on an outer side, which is facing away from the at least one inner volume region, of at least one of the holding bodies can be flowed through by the fluid, wherein in at least one enlarged section of the at least one inner volume region a spacing between the two holding bodies is greater than a spacing between the holding bodies in a region of the at least one contact section at least on its circumferential side that is facing the at least one enlarged section.

According to the invention, the at least one heating element is arranged between the two holding bodies. In this context, the at least one heating element has electrical and thermal contact with the contact section of at least one of the holding bodies. The at least one heating element, in particular its expansion axial to an imaginary axis of the heating element, can advantageously define the spacing between the two holding bodies in the at least one contact section. A spacing between the holding bodies is enlarged outside of the at least one contact section, i.e., adjacent to the at least one heating element, at least in the enlarged section. Accordingly, the at least one heating element can be thin also in relation to its lateral, in particular radial, expansion. The flow cross-section of the at least one inner volume region is not limited by the reduced spacing in the area of the at least one contact section.

Advantageously, the at least one enlarged section can border the facing circumferential side of the at least one contact section.

Advantageously, in at least one enlarged section the spacing between the two holding bodies can be greater than at least a smallest spacing between the holding bodies in the area of the at least one contact section.

Advantageously, a smallest spacing between the two holding bodies in the at least one inner volume region can be greater than the smallest spacing between the holding bodies in the area of the at least one contact section.

Advantageously, the spacing between the two holding bodies at least in the enlarged section of the at least one inner volume region can be greater than a greatest spacing between the holding bodies in the area of the at least one contact section.

Advantageously, a smallest spacing between the two holding bodies in the at least one inner volume region can be greater than a greatest spacing between the holding bodies in the area of the at least one contact section.

Advantageously, a course of the flow cross-section in the at least one inner volume region can be comparable to a course of the flow cross-section in the at least one outer volume region. In this way, fluid flows can be realized between the two holding bodies that are similar to the fluid flows within the at least one outer volume region. Accordingly, a uniform fluid flow about at least one of the holding bodies and the at least one heating element can be achieved. A uniform distribution of the fluid flow to at least two, preferably three, levels, in particular the at least one inner volume region and the at least one outer volume region, can be realized. The uniform distribution of the fluid flow to two or three flow levels can lead to an improved heat dissipation away from the at least one heating element and to an improved cooling of the at least one heating element. Accordingly, the operation of the heating device can be improved. While providing identical size, a greater heating power can be achieved. Alternatively, the heating power can be achieved with a smaller size.

Advantageously, the flow cross-sections can be approximately of the same size at least in comparable section planes through the volume regions. The comparable section planes can advantageously extend perpendicular to an average flow direction of the fluid through the volume regions. Advantageously, at least a minimal flow cross-section in the at least one enlarged section of the at least one inner volume region can be approximately as large as a minimal flow cross-section in the at least one outer volume region.

Advantageously, a contact surface of the at least one holding body in the at least one contact section can be designed in accordance with the adjoining or contacting surface of the heating element.

Advantageously, the at least one heating element can have one contact surface each on opposite end faces. The contact surfaces can contact a corresponding contact section of the corresponding holding body, respectively. In this context, a thermal and/or electrical contact can be realized advantageously.

Advantageously, the contact surfaces of the at least one heating element can be parallel. Advantageously, at least one of the contact surfaces can be planar. Correspondingly, the facing surface of the at least one contact section can be planar. Advantageously, the surfaces of the contact sections of the holding bodies and the contact surfaces of the at least one heating element can be designed to be coplanar. Accordingly, thermal and/or electrical contacting can be improved.

Advantageously, the at least one heating element can have the shape of a flat, particularly round, oval, or polygonal, cylinder, of a platelet or of a plate. The at least one heating element can contact with its large end faces one of the holding bodies. respectively. A thickness of the at least one heating element, in particular axial to the axis of the heating element, can be small relative to its lateral, in particular radial, expansion. The thickness of the at least one heating element can predetermine the spacing between the holding bodies in the area of the at least one contact section. With relatively thin heating elements, a heat transfer between the at least one heating element and the fluid can be improved. Since the spacing between the two holding bodies outside of the contact section is greater than in the area of the at least one contact section, the risk of a contact between the two holding bodies in the inner volume region can be reduced. In case that both holding bodies are electrically conducting, the risk of an electric short circuit can be reduced in this way.

Advantageously, the fluid can be fuel, oil, water, or urea solution in particular of an internal combustion engine and/or of a motor vehicle. The invention is however not limited to an internal combustion engine of a motor vehicle. Instead, it can also be employed in other types of internal combustion engines, in particular industrial motors. It can be used also in motor vehicles outside of the internal combustion engine.

Advantageously, the fluid system can be or can include a filter system for fluid with which the fluid can be purified. Advantageously, the fluid system can include at least one filter and/or a filter element for the fluid.

Advantageously, the heating device can be arranged upstream of the filter with respect to the fluid flow. In this way, the fluid can be heated with the heating device before it reaches the filter. In this way, the flowability of the fluid can be improved before the fluid reaches the filter. The pressure difference of the fluid between the raw side and the clean side of the filter can be reduced in this way. When using the invention in connection with the fuel system of an internal combustion engine, the cold start behavior, in particular for low ambient temperatures, can be improved in this way.

Advantageously, the filter can be or can include a hollow filter element, in particular round filter element. The hollow filter element can advantageously include a circumferentially closed filter medium. The filter medium can be folded advantageously in a zigzag shape. The hollow filter element can advantageously be flowed through by the fluid in radial direction from the exterior to the interior or in reverse.

In an advantageous embodiment, the at least one heating element can contact both holding bodies at least electrically.

In this way, the at least one heating element can be connected via the holding bodies with a pole of an electrical voltage source, respectively. Due to the inventively enlarged spacing of the two holding bodies outside of the contact sections, the risk of electrical short-circuiting between the holding bodies can be reduced.

Advantageously, the at least one heating element can be in thermal contact with both holding bodies. Due to the thermal contact with both holding bodies, the surface area of the heating device that is active for heat exchange and across which the fluid can flow to thereby be heated can be enlarged as a whole.

In a further advantageous embodiment, on the outer sides of both holding bodies that are facing away from the at least one inner volume region at least one corresponding outer volume region can be arranged. In this way, on both outer sides at least one outer volume region that can be flowed through by the fluid can be realized. The fluid can thus flow about the at least one heating element and the holding bodies at three flow levels. Heat transfer between at least said one heating element and the fluid can thus be further improved.

In a further advantageous embodiment, at least one of the holding bodies can be made of or can include metal, in particular sheet metal. With metal, a good electrical conductivity can be realized. Moreover, with metal a good thermal conductivity can be realized. Metal can be processed easily, in particular bent or cut. Holding bodies of sheet metal can be realized easily. They can be simply bent. Sheet metal can be realized with a thickness that is minimal in comparison to its lateral expansion. In this way, a required size can be optimized.

In a further advantageous embodiment, at least one of the holding bodies can include at least one ring-like part, in particular at least one sector of a circular ring disk. The ring-like holding body can be arranged in a simple and space-saving way in a ring-shaped heating chamber. Advantageously, at least one of the holding bodies can be a ring or a sector of a ring. Advantageously, a pin, in particular centering pin, of a housing, in particular of the heating chamber, can extend through a central opening of the ring.

Advantageously, the ring-like part can be open at one circumferential side. Advantageously, the ring-like part can be a sector of a ring disk, in particular a circular ring disk.

The ring-like part can advantageously have an imaginary axis. Viewed in profile, the ring-like part, in particular the circular ring disk or the sector of the circular ring disk, viewed relative to the axis in a radial direction from the interior to the exterior, can have a radial inner area, a central area, and a radial outer area. The at least one contact section can advantageously be arranged in the central area. The radial inner area and the radial outer area of the ring-like part can at least partially delimit respective sections of the at least one inner volume region on their side. In this way, a section of the at least one inner volume region can be realized radially within and radially outside of the at least one contact area. In this way, the at least one heating element can be flowed about circumferentially by the fluid in a better way and across a greater surface area.

On or in the central area of the ring-like part, advantageously at least one means, in particular at least one opening or positioning opening and/or at least one projection, can be provided for attachment and/or positioning of the at least one holding body relative to the at least one heating element and/or relative to the heating chamber.

In a further advantageous embodiment, at least one of the holding bodies can have at least one bend or step at least in the area of a transition between the at least one contact section and the at least one inner volume region. In this way, different spacings between the holding bodies can be realized on either side of the bend or step.

Advantageously, the spacing between the holding bodies in the at least one inner volume region can grow in particular uniformly with increasing distance from the at least one contact section. Alternatively, the spacing between both holding bodies in the at least one inner volume region can be constant. Advantageously, for this purpose the bend or step can be approximately S-shaped or Z-shaped in profile. In case several inner volume regions are provided, the spacings provided thereat can be different or the same or can have different or the same courses.

Advantageously, the two holding bodies each can includes at least one bend or step.

Advantageously, the holding bodies can be symmetric, particularly bent or stepped, relative to a center plane between the holding bodies. In this way, uniformity of the flow passing through can be further improved.

In a further advantageous embodiment, the at least one heating element can include a temperature-dependent electrical resistor, in particular with a positive temperature coefficient. In this way, a self-regulating effect for the at least one heating element can be achieved. The self-regulating effect can be utilized in order to avoid overheating of the heating system in case no fluid is flowing through the heating device. In case no fluid is flowing through the heating device, the temperature of the at least one heating element can increase greatly. Accordingly, the electrical resistance of the at least one heating element can increase greatly. Due to the self-regulating effect, the heating power can be greatly reduced accordingly and overheating of the heating system can be prevented.

Advantageously, the at least one heating element can be or can include a so-called PTC element. A PTC element has a temperature-dependent electrical resistance with a positive temperature coefficient (PTC).

When using a heating element with a temperature-dependent electrical resistor, in particular a PTC element, in combination with the uniform distribution of the flow to different flow levels, a working point of the heating element can be shifted to reduced temperatures. The working point of the at least one heating element can be shifted to reduced electrical resistance values. A power output of the at least one heating element for identical space or identical size of the at least one heating element can thus be increased.

In a further advantageous embodiment, the at least two holding bodies with the intermediately positioned at least one heating element can be held by a holding device that is in particular elastic. By means of the holding device, the holding bodies and the at least one heating element can be held together. With the holding device, the holding bodies with the heating element can be positioned stably and precisely within the heating chamber. Moreover, with the holding device an electrical contact and/or a thermal contact between the at least one heating element and at least one of the holding bodies can be improved. The electrical and/or thermal contact can thus be ensured.

Advantageously, the holding device can be elastic. Due to the elasticity of the holding device, an installation tolerance and/or operation-related tolerance can be compensated in a simple way. Advantageously, the holding device can include at least one elastic component. The at least one elastic component can advantageously be or include an elastic pressure element. The at least one elastic component can include or can be at least one elastic spring element, in particular a leaf spring.

The at least one elastic component can be supported with one side on at least one of the holding bodies and with another, in particular oppositely positioned, side can be supported in particular on a location that is fixed relative to the heating chamber, in particular a wall.

The at least one elastic component can be advantageously supported on the outer side of the corresponding holding body positioned opposite the at least one heating element. In this way, force transmission of the elastic component onto the contact area can be improved. Contact between the at least one holding body and the at least one heating element can thus be improved. Advantageously, the at least one elastic component can be supported in the area of the at least one contact section.

Advantageously, an abutment can engage the at least one outer side of the respective other holding body, which outer side is positioned opposite the at least one elastic component. The abutment can advantageously be fixedly connected relative to the heating chamber, in particular connected with a wall of the heating chamber. Advantageously, the abutment can be rigid or elastic.

Advantageously, the at least one elastic abutment can engage in the area of the corresponding at least one contact section.

Advantageously, the at least one elastic component and/or the abutment can be arranged optionally adjacent to or between two appropriate bends or steps of the at least one holding body, in particular optionally in the center area of the ring-like part. In this way, the abutment and/or the at least one elastic component can be arranged in an appropriate recess in a space-saving way within the heating chamber.

The technical object is further solved according to the invention with the heating device in that, in the at least one heating chamber, at least one electrically operated heating element is arranged between two holding bodies in such a way that it is electrically and thermally contacting at least one contact section of at least one of the holding bodies, wherein at least one inner volume region between the two holding bodies and at least one outer volume region on an outer side, which is facing away from the at least one inner volume region, of at least one of the holding bodies can be flowed through by the fluid, wherein in at least one enlarged section of the at least one inner volume region a spacing between the two holding bodies is greater than a spacing between the holding bodies in a region of the at least one contact section at least on its circumferential side that is facing the at least one enlarged section.

The advantages and features which have been explained in connection with the fluid system according to the invention and its advantageous embodiments apply likewise to the heating device according to the invention and its advantageous embodiments, and vice versa.

BRIEF DESCRIPTION OF THE DRAWINGS

Further advantages, features, and details of the invention result from the following description in which embodiments of the invention will be explained in more detail with the aid of the drawing. A person of skill in the art will expediently consider the features, disclosed in combination in the drawing, the description, and the claims, also individually and combine them to meaningful additional combinations.

FIG. 2 shows a detail section of the filter system of FIG. 1 in the area of the heating device.

FIG. 3 is an isometric illustration of a bottom contact sheet of the heating device of the FIGS. 1 and 2.

FIG. 4 is a detail section of a heating device according to a second embodiment, as it can be employed in the filter system of FIGS. 1 and 2.

FIG. 5 is a cross-section of a heating device according to a third embodiment.

FIG. 6 is a detail section of a heating device according to a fourth embodiment.

In the Figures, same components are provided with same reference characters.

DESCRIPTION OF THE INVENTION

Figure 1:
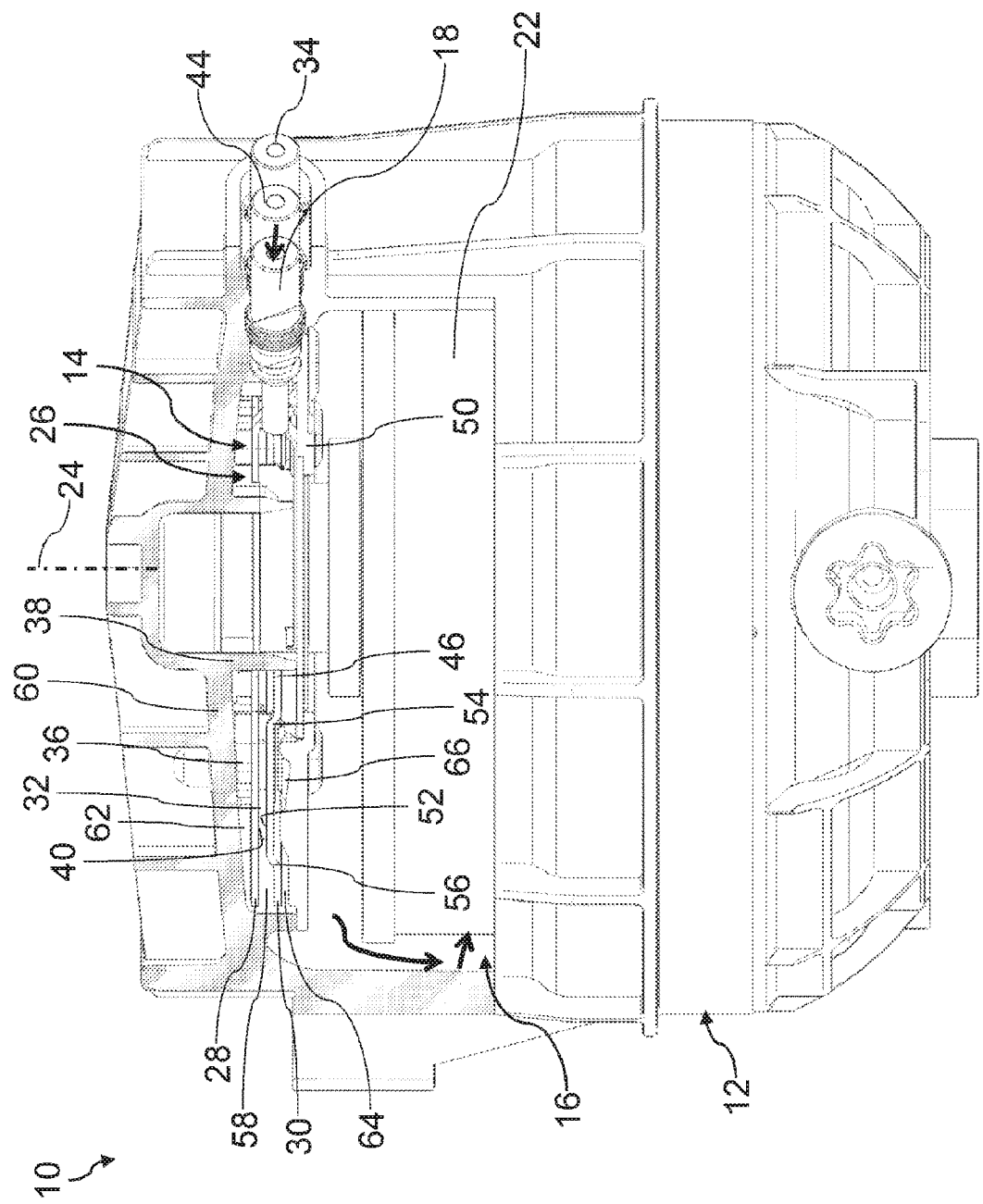
FIG. 1 shows a partial section of a filter system for fuel of an internal combustion engine of a motor vehicle, including a heating device for the fuel, according to a first embodiment.

In FIGS. 1 and 2, a filter system 10 for fuel is illustrated. The filter system 10 is arranged in a fuel line of an internal combustion engine of a motor vehicle. It serves for cleaning the fuel, for example, diesel fuel.

The filter system 10 includes a filter housing 12 with a heating chamber 14, in FIG. 1 at the top, and a filter chamber 16, at the bottom. An inlet 18 for the fuel opens into the heating chamber 14. An outlet 20, illustrated in FIG. 2, extends from the heating chamber 14 into the filter chamber 16 on a side positioned radially opposite relative to the system axis 24 of the filter system 10.

In the filter chamber 16 a round filter element 22 is arranged which includes a zigzag-folded circumferentially closed filter medium for the fuel.

The round filter element 22, the heating chamber 14, and the filter chamber 16, as a whole, are arranged coaxially to the system axis 24. The round filter element 22 is flowed through radially from the exterior to the interior for filtration of the fuel. An element interior of the round filter element 22 forms a clean side of the round filter element 22. It is connected with a system outlet of the filter system 10 which is not of interest in this context and through which the purified fuel exits from the filter system 10. The outlet 20 of the heating chamber 14 connects the heating chamber 14 with a raw side that surrounds outwardly the round filter element 22 in radial direction.

An electrical heating device 26 for the fuel is provided in the heating chamber 14. With the heating device 26, the fuel can be heated after entering the filter housing 12 before it reaches the raw side of the round filter element 22. In this way, the flowability of the fuel can be increased so that a pressure difference between the raw side and the clean side of the round filter element 22 can be reduced.

The heating device 26 includes a top contact sheet 28 and a bottom contact sheet 30 as holding bodies. The contact sheets 28 and 30 are each made of electrically and thermally conductive metal. It is inconsequential for the invention whether the top contact sheet 28 is spatially at the top or at the bottom. The designations "top" and "bottom" are used only for better comprehension.

Between the holdings bodies in the form of the top contact sheet 28 and the bottom contact sheet 30, a plurality of electrically operated heating elements 32 are arranged. The heating elements 32 are so-called PTC elements. The heating elements 32 each include a temperature-dependent electrical resistor with a positive temperature coefficient. The heating elements 32 each have approximately the shape of a flat circular cylinder.

The top contact sheet 28 has approximately the shape of a sector of a planar circular ring disk that extends about a circumferential angle of approximately 270 degrees. The top contact sheet 28 is thus open across a quarter of its circumference. The top contact sheet 28 includes a contact tab, not illustrated in the drawings, for an electrical line. The electrical line is connected with a first electrical connector 34 of the filter system 10.

The top contact sheet 28 is connected fixedly with the top wall 60 of the heating chamber 14 positioned opposite the filter chamber 16. On this side, the top contact sheet 28 is resting on abutments 36 which are connected monolithically with top wall 60. The abutments 36 are located on the outer side of the top contact sheet 28 opposite the bottom contact sheet 30.

The top contact sheet 28 has an opening which is coaxial to the system axis 24. A connecting socket 38 in the form of a round hollow cylinder and connected monolithically with the filter housing 12 extends through the opening. The connecting socket 38 is also coaxial to the system axis 24. An outlet passage, not of interest in this context, for the purified fuel is extending in the connecting socket 38 and connects the element interior of the round filter element 22 with the system outlet of the filter system 10.

The end faces of the heating element 32 which are axially opposite each other relative to the system axis 24 are coplanar. The top end faces of the heating element 32 which are facing the top contact sheet 28 each are resting flat on the inner surfaces of corresponding top contact sections 40 of the top contact sheet 28 which are facing the bottom contact sheet 30. The surfaces of the top contact section 40 which are facing the heating elements 32 are planar. They each extend perpendicular to the system axis 24. They are parallel to the top end faces of the heating elements 32. In the top contact sections 40, the heating elements 32 each are electrically and thermally contacting the top contact sheet 28.

The abutments 36 each are arranged relative to the system axis 24 axially opposite one of the heating elements 32. The abutments 36 engage the outer side of the top contact sheet 28 within the top contact sections 40.

The bottom contact sheet 30, which is shown in detail in FIG. 3, is also formed as a sector of a circular ring disk. It is open about approximately one fourth of its circumference.

The bottom contact sheet 30 includes a connecting tab 42 which is located adjacent to the open circumferential side. The connecting tab 42 extends in a direction away from the top contact sheet 28 on the outer side of the bottom contact sheet 30 which is facing away from the top contact sheet 28. The connecting tab 42 is connected by means of an appropriate electrical line with a second electrical connector 44 of the filter system 10.

The electrical connectors 34 and 44 are connected with a voltage supply, for example, with an onboard voltage supply system of the motor vehicle. They can be connected, for example, with a motor control unit of the internal combustion engine.

The bottom contact sheet 30 includes the central center opening 46 through which the connecting socket 38 is extending. Moreover, the bottom contact sheet 30 has two eccentric positioning openings 48 through which positioning pins are extending which are connected with the filter housing 12. The positioning openings 48 and the positioning pins determine the circumferential orientation of the bottom contact sheet 30 in the heating chamber 14 relative to the system axis 24.

Moreover, the bottom contact sheet 30 includes a plurality of bottom contact sections 52. Rims of the bottom contact sections 52 are indicated in FIG. 3 as dashed circles. On the inner side of the bottom contact sheet 30 which is facing the top contact sheet 28, the end faces of the heating elements 32 facing the bottom contact sheet 30 are resting flat on the appropriate surfaces of the bottom contact sections 52 where the heating elements 32 electrically and thermally contact the bottom contact sheet 30, respectively. The inner surfaces of the bottom contact sections 52 are planar. They extend perpendicular to the system axis 24. They are parallel to the bottom end faces of the heating elements 32. As a whole, the inner surfaces of the top contact sections 40 and the inner surfaces of the bottom contact sections 52 are coplanar.

Relative to the system axis 24, which is indicated in FIG. 3 for simplifying explanations, the bottom contact sheet 30 includes, in radial direction inwardly adjacent to the bottom contact sections 52, a radial inner bent section 54. In radial direction outwardly adjacent to the bottom contact sections 52, the bottom contact sheet 30 includes a radial outer bent section 56. The bent sections 54 and 56 extend coaxially to the system axis 24.

Radially within the radial inner bent section 54 relative to the system axis 24, the section of the bottom contact sheet 30 provided thereat is bent away from the top contact sheet 28 relative to the system axis 24, viewed in axial direction. Accordingly, a section radially outwardly of the radial outer bend section 56 is bent away from the top contact sheet 28. The inner surfaces of the sections radially within the radial inner bent sections 54 and radially outside of the radial outer bent section 56 each extend coplanar to an imaginary radial extension of the inner surface of the radial intermediately positioned central section of the bottom contact sheet 30 in which the bottom contact sections 52 are provided.

The inner sides of the top contact sheet 28 and of the bottom contact sheet 30 that are facing each other delimit an inner volume region 58 outside of the contact sections 52.

An outer top volume region 62 is arranged between the outer side of the top contact sheet 28 which is facing away from the bottom contact sheet 30 and the top wall 60 of the heating chamber 14.

An outer bottom volume region 64 is arranged between the outer side of the bottom contact sheet 30 that is facing away from the top contact sheet 28 and the bottom wall 50.

The inner volume region 58 and the outer volume regions 62 and 64 each can be flowed through by the fuel on its path from the inlet 18 to the outlet 20.

The inner volume region 58 and the two outer volume regions 62 and 64 each have a similar flow cross-section with regard to size. In this way, similar fuel quantities can flow uniformly through all three volume regions 58, 62, and 64 at three flow levels. This is achieved in that, as a result of the bends of the bottom contact sheet 30, a spacing between the top contact sheet 28 and the bottom contact sheet 30 in enlarged sections of the inner volume region 58 adjacent to the radial inner circumferential sides and the radial outer circumferential sides of the contact sections 40 and 52, relative to the system axis 24, is greater than in the areas between the top contact sections 40 and the bottom contact sections 52. The spacing between the contact sheets 28 and 30 in the area between the contact sections 40 and 52 in a second embodiment, illustrated in FIG. 4 and explained infra, is identified with reference character 65. The spacing between the contact sheets 28 and 30 in the inner volume region 58 is identified in FIG. 4 with the reference character 67.

Relative to the system axis 24, a pressure spring 66 each engages in the area of the bottom contact sections 52 at the outer side of the bottom contact sheet 30. The pressure springs 66, as an elastic holding device, are realized as leaf springs. The pressure springs 66 are supported on the bottom wall 50 with their sides which are facing away from the bottom contact sheet 30. By means of the pressure springs 66 the bottom contact sheet 30, the corresponding heating element 32, and the top contact sheet 28 are pressed together against the abutments 36. In this way, thermal and electrical contacting between the heating elements 32 and the contact sections 40 and 52 is ensured and improved.

In operation of the filter system 10, the fuel is passed through the inlet 18 into the heating chamber 14. The fuel flows through the volume regions 58, 62, and 64 and in this context is in thermal contact with the contact sheets 28 and 30 and the heating elements 32. Depending on the fuel temperature, the electrical resistance of the heating elements 32 changes and thus their individual heating power. The fuel is heated accordingly. The heated fuel passes through the outlet 20 into the filter chamber 16. It flows through the filter medium from the raw side of the round filter element 22 (radially outward) to the clean side (radially inward). The purified fuel exits from the filter housing 12 of the filter system 10 through the system outlet.

In FIG. 4, a section of a heating device 26 according to the second embodiment is illustrated which is similar to the first embodiment of FIGS. 1 to 3.

In FIG. 5, a heating device 26 according to a third embodiment is illustrated which is similar to the first embodiment of FIGS. 1 to 3 and the second embodiment of FIG. 4. In contrast to the first two embodiments, in the third embodiment the top contact sheet 28 similar to the bottom contact sheet 30 has a radially inner bent section 54 and a radially outer bent section 56. The arrangement with the two contact sheets 28 and 30 and the intermediately positioned heating elements 32 is approximately symmetrical relative to an imaginary center plane 368 of the heating elements 82. The center plane 368 extends perpendicular to the system axis 24.

In FIG. 6, a detail of a heating device 26 according to a fourth embodiment is illustrated. In contrast to the third embodiment of FIG. 5, the sections of the contact sheets 28 and 30 extend radially inwardly adjacent to the radial inner bent section 54 and radially outwardly adjacent to the radial outer bent section 56 at a slant relative to each other and not parallel. In this way, viewed from the contact sections 40 and 52, respectively, the inner volume region 58 widens in radial inward direction and in radial outward direction.

While specific embodiments of the invention have been shown and described in detail to illustrate the inventive principles, it will be understood that the invention may be embodied otherwise without departing from such principles.

What is claimed is:

1. A fluid system of an internal combustion engine, the fluid system comprising:
   at least one heating chamber including at least one inlet allowing a fluid to flow into the at least one heating chamber and at least one outlet allowing the fluid to exit from the at least one heating chamber;
   at least one heating device including two holding bodies arranged in the at least one heating chamber;
   the at least one heating device including at least one electrically operated heating element arranged between the two holding bodies such that the at least one heating element is electrically contacting and thermally contacting at least one contact section of at least one of the two holding bodies;
   the at least one heating device including at least one inner volume region between the two holding bodies and further including a first outer volume region arranged on a first outer side of a first one of the two holding bodies, wherein the first outer side is facing away from the at least one inner volume region, and wherein the at least one inner volume region and the first outer volume region are configured to allow the fluid to flow through;
   the at least one inner volume region including at least one enlarged section and the at least one enlarged section including a first spacing measured between the two holding bodies;
   the two holding bodies including a second spacing measured in a region of the at least one contact section, wherein the first spacing is greater than the second spacing at least at a circumferential side of the at least one contact section that is facing the at least one enlarged section.

2. The fluid system according to claim 1, wherein the at least one heating element is electrically contacting the two holding bodies.

3. The fluid system according to claim 1, wherein on a second outer side of a second one of the two holding bodies a second outer volume region is arranged, wherein the second outer side is facing away from the at least one inner volume region.

4. The fluid system according to claim 1, wherein at least one of the two holding bodies is made of or comprises metal.

5. The fluid system according to claim 4, wherein the metal is sheet metal.

6. The fluid system according to claim 1, wherein at least one of the two holding bodies comprises at least one ring part.

7. The fluid system according to claim 6, wherein the at least one ring part is at least one sector of a circular ring disk.

8. The fluid system according to claim 1, wherein at least one of the two holding bodies comprises at least one bent or step at least in a transition area between the at least one contact section and the at least one inner volume region.

9. The fluid system according to claim 1, wherein the at least one heating element comprises a temperature-dependent electrical resistor.

10. The fluid system according to claim 9, wherein the temperature-dependent electrical resistor has a positive temperature coefficient.

11. The fluid system according to claim 1, further comprising a holding device, wherein the two holding bodies and the at least one heating element positioned between the two holding bodies are held by the holding device in the at least one heating chamber.

12. The fluid system according to claim 11, wherein the holding device is elastic.

13. The fluid system according to claim 1, wherein the fluid system is a filter system for fuel, oil, water or urea solution.

14. A heating device for a fluid system, the heating device comprising:
    two holding bodies arranged in at least one heating chamber;
    at least one electrically operated heating element arranged between the two holding bodies such that the at least one heating element is electrically contacting and thermally contacting at least one contact section of at least one of the two holding bodies;
    at least one inner volume region disposed between the two holding bodies;
    a first outer volume region arranged on a first outer side of a first one of the two holding bodies, wherein the first outer side is facing away from the at least one inner volume region, and wherein the at least one inner volume region and the first outer volume region are configured to allow the fluid to flow through;
    the at least one inner volume region including at least one enlarged section and the at least one enlarged section comprising a first spacing measured between the two holding bodies;
    the two holding bodies including a second spacing measured in a region of the at least one contact section, wherein the first spacing is greater than the second spacing at least at a circumferential side of the at least one contact section that is facing the at least one enlarged section.

15. The heating device according to claim 14, wherein on a second outer side of a second one of the two holding bodies a second outer volume region is arranged, wherein the second outer side is facing away from the at least one inner volume region.

* * * * *